United States Patent
Schrenk et al.

(10) Patent No.: US 8,396,375 B2
(45) Date of Patent: Mar. 12, 2013

(54) METHOD AND APPARATUS FOR BIDIRECTIONAL OPTICAL LINK USING A SINGLE OPTICAL CARRIER AND COLORLESS DEMODULATION AND DETECTION OF OPTICAL FREQUENCY SHIFT KEYED DATA

(75) Inventors: Bernhard Schrenk, Barcelona (ES); José Antonio Lázaro Villa, Barcelona (ES); Christophe Kazmierski, Marcoussis (FR); Josep Joan Prat Gomà, Barcelona (ES)

(73) Assignee: Universitat Politecnica de Catalunya, Barcelona (ES)

( * ) Notice: Subject to any disclaimer, the term of this patent is extended or adjusted under 35 U.S.C. 154(b) by 293 days.

(21) Appl. No.: 12/707,991

(22) Filed: Feb. 18, 2010

(65) Prior Publication Data

US 2011/0200333 A1 Aug. 18, 2011

(51) Int. Cl.
*H04B 10/06* (2006.01)

(52) U.S. Cl. ........ 398/202; 398/203; 398/204; 398/205; 398/206; 398/207; 398/208; 398/209; 398/210; 398/211; 398/212; 398/213; 398/214

(58) Field of Classification Search ................... None
See application file for complete search history.

(56) References Cited

U.S. PATENT DOCUMENTS

| | | | | |
|---|---|---|---|---|
| 5,357,363 | A * | 10/1994 | Li et al. | 398/141 |
| 5,515,193 | A * | 5/1996 | Sorel et al. | 398/139 |
| 6,263,002 | B1 * | 7/2001 | Hsu et al. | 372/6 |
| 6,538,808 | B1 * | 3/2003 | Tastavridis | 359/344 |
| 2003/0142390 | A1 * | 7/2003 | Parry et al. | 359/337 |
| 2004/0175177 | A1 * | 9/2004 | Lee et al. | 398/72 |

OTHER PUBLICATIONS

Grobe et al., "PON in Adolenscence: From TDMA to WDM-PON", Jan. 2008, IEEE Communications Magazine, pp. 26-34.*
Monroy et al., "85 km long reach PON system using a reflective SOA-EA modulator and distributed Raman fiber amplification", IEEE, Lasers and Electro-Optics Society, 2006. LEOS 2006. 19th Annual Meeting of the IEEE, pp. 705-706.*
Prat et al., "Full-Duplex Single Fiber Transmission Using FSK Downstream and IM Remote Upstream Modulations for Fiber-to-the-Home," IEEE Photonics Technology Letters, vol. 17, No. 3, Mar. 2005, pp. 702-704.
Martinez et al., "Novel WDM-PON Architecture Based on a Spectrally Efficient IM-FSK Scheme Using DMSs and RSOAs," Journal of Lightwave Technology, vol. 26, No. 3, Feb. 1, 2008, pp. 350-356.

* cited by examiner

*Primary Examiner* — Kenneth N Vanderpuye
*Assistant Examiner* — Darren E Wolf
(74) *Attorney, Agent, or Firm* — RatnerPrestia (57) ABSTRACT

A method for enabling bidirectional data communication using a single optical carrier and a single laser source with the aid of an integrated, colorless demodulator and detector for frequency modulated signals, and a reflective modulator. A receiving optical system holds a technique for demodulation and detection of optical frequency modulated signals, enabling remodulation of the incoming signal to establish bidirectional communication with the transmitting optical system, without introducing a high penalty. A colorless demodulator and detector, which provides the functionality of a periodic filtering device for demodulation of the downstream, and also detection capability. The principle of operation of the CDD relies on the introduction of a comb transfer function with the help of a Semiconductor Optical Amplifier, by providing a reflected feedback signal to the CDD's active element. This periodic transfer function is obtained by an optical cavity and allows for wavelength-independent operation on a given wavelength grid.

12 Claims, 5 Drawing Sheets

METHOD AND APPARATUS FOR BIDIRECTIONAL OPTICAL LINK USING A SINGLE OPTICAL CARRIER AND COLORLESS DEMODULATION AND DETECTION OF OPTICAL FREQUENCY SHIFT KEYED DATA

TECHNICAL FIELD

The present invention relates to a receiving optical apparatus of a bidirectional optical link that uses a single wavelength with demodulation and detection of frequency modulated signal in a colorless and integrated way, next to re-modulating this signal with the aid of reflective modulation.

The present invention also refers to a method for enabling bidirectional data communication using a single optical carrier modulated in frequency and an apparatus as the cited one, at a user premises.

BACKGROUND ART

Optical fiber communications is one of the drivers to enable broadband services to be delivered by an operator to the customers that can be spread over larger geographic areas. Optical fiber is used as transmission medium because it offers several advantages compared to the copper wires, such as the traditional twisted pair. Fiber-to-the-X (FTTx) technology (X can stand for Curb, Node, Building, Home or other) has been extensively studied worldwide, for delivering high bandwidth to users and for converging wireless and wireline.

An important point for FTTx is the capability for building future-proof broadband networks with low installation and operating expenditures. While active optical networks (AONs) exist, taking advantage of repeaters and switches for reach extension and routing, passive optical networks (PONs) are also gaining attention due to the fact that no active components are deployed in the distribution plant between the operator and the customers. In this way, cost deriving from maintenance of active devices can be kept low as they are situated either at the central office of the provider or located at the customer premises.

The capacity and number of served users can be expanded by taking multiplexing technologies into account in the architecture of the access network (AN), regardless if it is of active or passive nature. As the optical fiber is suitable to transmit on multiple optical frequencies, wavelength division multiplexing (WDM) can lead to a significant improvement in cost and capacity, as fiber infrastructure can be shared between the customers while more data signals can be transmitted on different wavelengths. This kind of AN has an optical multiplexer situated between the operator and its customers, and is herein referred to as a WDM-AN.

Furthermore, each wavelength can, for the case of a so-called hybrid AN, be divided into time slots by means of time division multiplexing (TDM) for splitting the signal in its power to a bunch of customers instead of only one. Although this procedure leads to a reduction in the data rate per user, the naturally high data rates that can be achieved for each wavelength, thanks to the maturity of optical transmitters, ensures that the net data rates for the single customers still stay high. This kind of AN has, in addition to the multiplexer of the WDM-AN, a power splitter located at each output of the multiplexer, while the customers are connected to the outputs of the power splitter. Such an AN is herein referred to as a WDM/TDM-AN.

Expanding the AN by multiplexing means that the cost can be reduced due to a shared infrastructure at the fiber distribution plant and also at the central office of the network operator, referred to as the optical line terminal (OLT) herein, where several light sources and expensive equipment such as modulators and devices for signal conditioning are located. One requirement for introducing multiplexing into the AN is to keep the customer premises equipment, referred to as the optical network unit (ONU) herein, identical and therefore agnostic to these multiplexing techniques. A reflective design without active optical source or a design with a tunable optical source allows to have one single ONU, which can be used at any position inside the AN (i.e. the ONU is operable with different wavelengths and at different ports or a power splitter). Such a design that is suitable for mass deployment of ONU ensures cost effectiveness as the ONU will determine the expenditures for an AN with a high number of users.

The use of reflective modulators integrated together with optical amplifiers at the customer premises is a promising solution for the ONU. In this way, the loss over the network can be overcome while imprinting upstream transmission data on the incoming signal. An efficient AN uses a single wavelength as optical input signal for an ONU, which carries the data transmission from the OLT, referred to as the downstream, and also the data transmission from the ONU back towards the OLT, referred to as the upstream. These two data streams are present at the same time due to the bidirectional nature of communication.

Realistic deployment of the access networks discussed above, require ONUs that are not wavelength-dependent (color-agnostic or colorless) and are capable of re-using the same downstream signal wavelength for modulating the upstream data. Re-modulation of downstream can be efficiently done by using orthogonal modulation formats, as they avoid crosstalk between down- and upstream. However, the design of the ONU becomes more complicated as more complex modulation formats have to be used (compared to the simplest intensity modulation format), which may prevent a cost-effective deployment of customer premises equipment. This disadvantage is mainly motivated by the inability of photo-detectors to acquire information from the optical signal such as phase or frequency in addition to its intensity. Therefore, modulation formats that imprint data in the phase or frequency of the optical signal require in principle additional components such as filters or other information-converting structures [Prat05] [Martinez08].

Promising candidates for a reflective modulator, which can take the advantage of just having to modulate the intensity of the constant-envelope downstream signal, are the reflective semiconductor optical amplifier (RSOA), the reflective electro-absorption modulator or integrated versions of semiconductor optical amplifier (SOA) and reflective electro-absorption modulator (REAM), where the SOA acts as amplifier to overcome also the losses of the REAM or any reflective active optical component capable of intensity modulating the upstream data signal.

REFERENCES

[Prat05] J. Prat et al., "Full-Duplex Single Fiber Transmission Using FSK Downstream and IM Remote Upstream Modulations for Fiber-to-the-Home," Phot. Tech. Lett., vol. 17, pp. 702-704 (2005).

[Martinez08] J. J. Martinez et al., "Novel WDM-PON Architecture Based on a Spectrally Efficient IM-FSK Scheme Using DMLs and RSOAs," J. Lightwave Tech., vol. 26, pp. 350-356 (2008).

SUMMARY OF THE INVENTION

The present invention provides a method for enabling bidirectional data communication using a single optical carrier and a single laser source with the aid of an integrated, colorless demodulator and detector for frequency modulated signals, and a reflective modulator.

The invention also provides a receiving optical apparatus of a bidirectional optical link that uses a single wavelength with demodulation and detection of frequency modulated signal in a colorless and integrated way, that be following disclosed.

According to the present invention, an optical transmission network from type of either AN, WDM-AN or WDM/TDM-AN is provided, comprising:
- an OLT containing optical sources for transmitting frequency modulated downstream data signals towards the ONUs and also receivers for the reception of the upstream data from several ONUs, transmitted in intensity modulation;
- a fiber distribution plant, referred to as the optical distribution network (ODN) herein, comprising fiber to connect several units at the border of the ODN. It can also include one or more interconnecting points, referred to as the remote nodes (RN), for relaying the data traffic from the OLT to the ONUs and backwards. These conjunction points between different segments of the ODN are not further specified;
- ONUs that comprise receivers for the downstream after being optically demodulated into an intensity modulated format, and reflective modulators that use the downstream signals for the upstream transmission.

The ONU holds a technique for demodulation and detection of optical frequency modulated downstream signals, enabling remodulation of the downstream signal with upstream data without introducing a high penalty. This is achieved by means of a colorless demodulator and detector (CDD), which provides the functionality of a periodic filtering device for demodulation of the downstream, and also a detection capability. It is used after the splitter that extracts part of the incoming signal into the ONU for downstream detection. The CDD is adjusted to the frequency deviation of the downstream signal, but not further specified at the moment (details can be seen in the next section). The principle of operation of the CDD relies on the introduction of a comb transfer function with the help of a SOA, by providing a reflected feedback signal to this active element used in the CDD. This periodic transfer function is obtained by an optical cavity and allows for wavelength-independent operation on a given wavelength grid, such as the ITU WDM wavelength grid.

The upstream can be then intensity modulated onto the incident downstream signal, due to the fact that the incoming frequency modulated signal has in principle a constant envelope. The upstream modulator is preferably from reflective nature, but does not necessarily have to be. The chosen modulation scheme allows reusing the wavelength also for upstream transmission without passing parts of the downstream back to the upstream receiver, which would introduce a significant reception penalty for the upstream.

A control loop may be used together with a tapped electrical downstream signal to provide a feedback to the CDD for stabilization of its operation point.

Two preferred embodiments for the ONU are considered, which depend on the capability of concurrent upstream transmission during the downstream detection. For the first preferred embodiment, the ONU is extended with an optical transmitter in addition to the CDD used for detection, to provide full-duplex transmission. In this case, the downstream is remodulated with the said optical transmitter. For the second preferred embodiment, the CDD inside the ONU is not only used for detection of the downstream but also for transmission of the upstream data. In this latter case, a simpler realization of the ONU is provided at the cost of half-duplex transmission.

BRIEF DESCRIPTION OF THE DRAWINGS

A more detailed description of the present invention will be given by taking reference to the accompanying drawings which are showing examples for realizing the present invention, allowing providing an illustrative description for the preferred embodiments.

It shall be stressed that the drawings provided contain all essential information that is believed to be most relevant for an understanding of the principles of the present invention. Furthermore, no attempt is made to show unnecessarily detailed structures of the present invention, for ease of understanding. In this way, non-essential elements were skipped from some of the drawings. For the cases where no example is given, it is left to those who are skilled in art, how the fundamental structures depicted in the drawings may be realized in practice.

DETAILED DESCRIPTION OF THE INVENTION

Before an explanation of the present invention is given, it has to be noted that the present invention is not limited in its applicability to the details set in the following discussion or the examples provided. The present invention can be carried out in various embodiments. It shall be understood that certain features that are described in the context of different embodiments, may also be provided for a certain specific embodiment. In turn, certain features that are described in context of a single embodiment may also be provided for any other suitable embodiment included in the description of the present invention.

The terms "comprises", "comprising", "includes", "including", and "having" are supposed to be understood as "including but not limited to", while the term "consisting of" has the same meaning as "including and limited to". The term "consisting essentially of" means that the structure may include additional parts, but only if these additional parts do not perturb or alter the basic and novel characteristics of the claimed structure. Furthermore, the singular form "a", "an", and "the" include also plural references unless it is otherwise dictated by the context.

Detailed Description of the Method and Apparatus of this Invention

A novel ONU is introduced based on a solution with integrated semiconductor devices for colorless demodulation and detection of the downstream signal while remodulating the downstream with upstream data via a simple intensity modulator. This method enables significant performance improvement in terms of sensitivity for the upstream reception at the OLT due to the orthogonal modulation formats used.

Considering the preferred embodiment of the present invention, modifications are required only at the ONU and do not perturb the fiber distribution plant nor the OLT (besides using frequency modulation instead of intensity modulation for the downstream signal), nor do other preferred embodiments of the present invention.

In discussion of several figures herein, similar numbers refer to similar parts. The drawings further do not have to be scaled.

1. Operation of an Apparatus Implementing the Proposed Method

Figure 1:
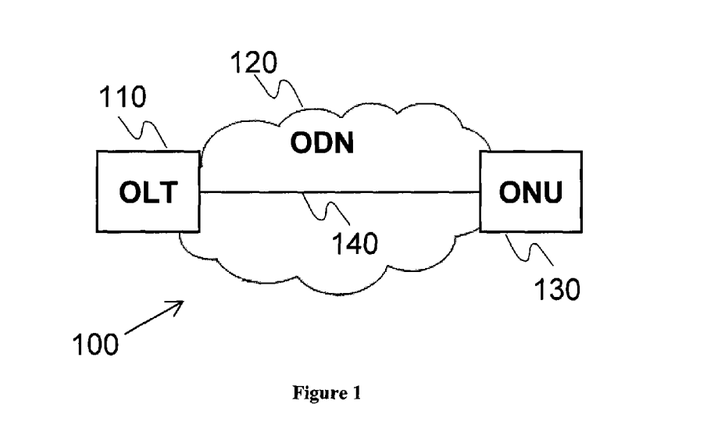
FIG. 1 depicts the AN with downstream data streams modulated in their frequency and upstream data sent modulated in its intensity, in which context the ONU enables the colorless demodulation and detection of the downstream signals at the customer premises, according to the present invention.

Reference is now made to FIG. 1 which illustrates the AN architecture 100, in which context the present invention is embedded.

The AN 100 comprises an OLT 110, an ONU 130 that are connected via the ODN 120 which includes a bidirectional link 140. Signals originating from the OLT 110 towards the ONU 130 are referred to as downstream signals, while signals originating from the ONU 130 towards the OLT 110 are referred to as upstream signals.

In its simplest version of the AN 100, the ODN 120 comprising a bidirectional link 140, which can be established by a single optical fiber. In an extended version, the ODN 120 would incorporate techniques of WDM and TDM as described before.

The OLT 110 includes the optical source of the AN 100 and an optical frequency modulator, used for imprinting the optical carrier with downstream data. The frequency deviation of the frequency shift keyed downstream modulation is adjusted to the parameters used in the design of the CDD in the ONU 130. The bidirectional data transmission along the fiber link 140 has to be splitted/merged to the two unidirectional paths of the optical transmitter and receiver of the OLT 110, e.g. with the help of an optical circulator. The optical receiver of the OLT 110 includes further photo detectors such as PIN diodes or avalanche photo diodes.

Depending on the requirements inside the AN 100, the OLT 110 may further have other components such as optical amplifiers, means of dispersion compensation, optical WDM multiplexer/demultiplexer and electronic signal conditioning. The OLT 110 is capable to perform higher layer functionalities and is interconnected to an operator interface according to modern AN standards.

The OLT 110 and the fiber infrastructure of the AN 100 can be shared between multiple operators, which are delivering different types of services towards the customers. The ONU 130 then has to be capable to switch between different operators in a proper way, to enable this feature of multi-operability in the AN 100.

The ONU 130, hosted at the customer premises and responsible for downstream reception and upstream data transmission, is now discussed in more detail in its preferred embodiments of the present invention.

Figure 2:
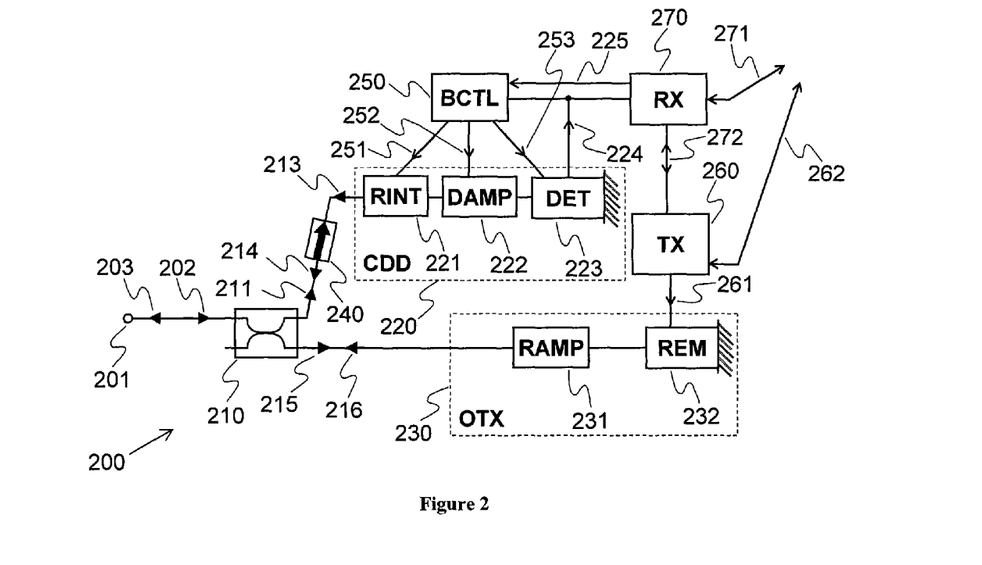
FIG. 2 depicts an ONU for full-duplex transmission in ANs with orthogonal modulation formats for both bit stream directions, including a CDD and a control mechanism for adjusting the CDD, according to the present invention.

Reference is now made to FIG. 2 illustrating an ONU 200 with a CDD for full-duplex data transmission, in accordance with the first preferred embodiment of the present invention.

The ONU 200 is connected by line 201 towards the ODN 120 of the AN 100. An optical coupler 210 splits off a part of the downstream 202 and relays this part 211 to the CDD 220, which is used for demodulation and detection of the downstream. The detected electrical signal 224 is fed to the electrical receiver 270. This in turn contains methods for electrical signal conditioning and higher layer functionalities. The interconnection to the user interface that is compliant with an AN standard is made via line 271.

As the CDD 220 may cause reflections, indicated by the signal 213, an isolator 240 may be placed in between the optical coupler 210 and the CDD 220. For the case that there is no isolator 240, the signal 214 will overlap with the upstream 216 at the launched output signal 203 of the ONU 200.

The key part, the CDD 220 contains a reflective interface (RINT) 221, an amplifier (DAMP) 222 and a detector (DET) 223. The reflective facet that is attached to the DET 223 provides feedback towards the RINT 221 at the entrance of the CDD 220. Together with the bidirectional DAMP 222, a periodic transfer function for the CDD 220 is established via the mirror reflections of the RINT 221 and the reflective facet attached to the DET 223. While the RINT 221 may be constructed passively, the DAMP 222 can be a SOA or any other suitable amplifier, and the DET 223 may be an REAM or any other suitable reflective detector. The optical length of the CDD 220, determined by the geometrical lengths and refractive indices of the DAMP 222 and the DET 223, as well as the geometry of the RINT 221 and its refractive index, determines the free spectral range (FSR) of the generated comb that is used for demodulation of the frequency modulated downstream signal.

To align the comb of the detection function of the CDD 220 to the spectrum of the incident downstream signal, the CDD 220 is connected with a bias controller (BCTL) 250. This controller provides the electrical bias signals 251, 252 and 253 for the RINT 221, the DAMP 222 and the DET 223, respectively. The RINT 221 may not require a bias signal 251. The alignment of the comb is obtained by small variations of the bias signals 251, 252 and 253 around their usual bias points. Alternatively, also the temperature of the semiconductor-based CDD 220 could be varied. On which of the bias signals these variations are applied, depends on the chosen realization for the RINT 221, DAMP 222 and DET 223. The feedback signal for the BCTL 250 is obtained from the detected downstream signal 224. Alternatively, the steering signal 225 for the BCTL 250 may stem from the receiver (RX) 270 which can be also provided in addition to the detected signal 224.

The BCTL 250 includes an electronic control circuit and an electrical driver circuit that is capable of driving the RINT 221, the DAMP 222 and the DET 223 with appropriate electrical signals, depending on the physical realization of the CDD 220.

The other part of the downstream signal is relayed as signal 215 to pass to the optical transmitter (OTX) 230 which performs the function of remodulating the constant envelope downstream signal 215 with upstream data. For this reason, an intensity remodulator (REM) 232 is used, which might be reflective as shown in FIG. 2. The modulator can be from for example a REAM, a RSOA or other suitable intensity modulators. For the case that REM 232 introduces optical losses, an amplifier (RAMP) 231 may be placed in the OTX 230. This amplifier can be a SOA that might be also integrated together with the REM 232.

The transmitter (TX) 260 contains high layer functionalities as well as adaptation of the electrical driving signal 261. Line 262 connects the TX 260 to the user interface according to an AN standard. The TX 260 is capable of driving the REM 232 in a proper way, including adaptation of the base-band frequency data signal and adaptation of the bias point in terms of adjustment of the bias current and/or voltage for the REM 232. A direct interconnection 272 between RX 270 and TX 260 may be present for higher layer functionality such as signaling inside the AN.

Although a reflective OTX 230 is preferred for wavelength reuse, it may comprise a direct or external modulated laser diode that may also be tuned in its wavelength.

Figure 3:
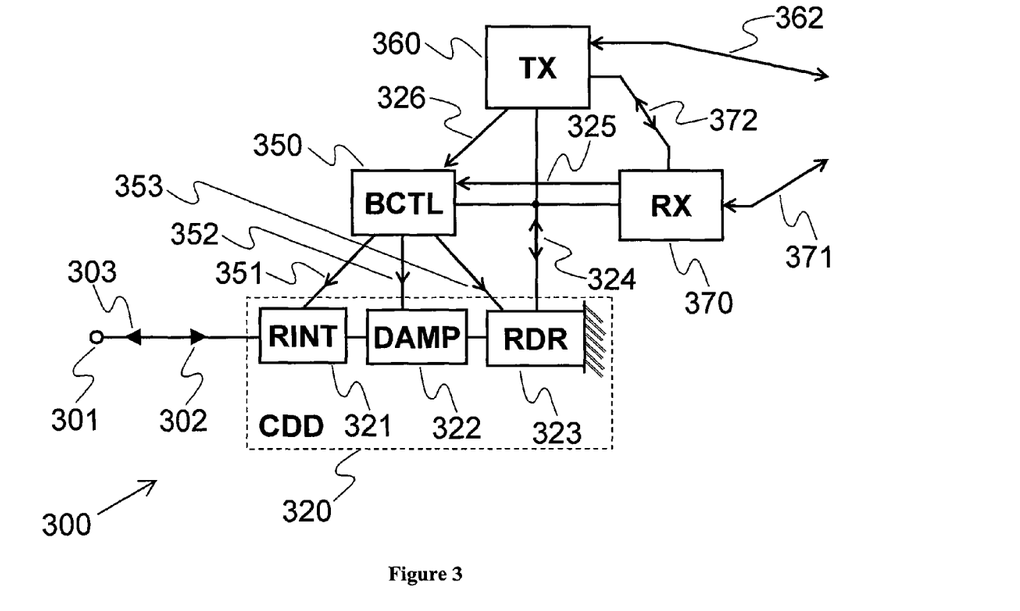
FIG. 3 depicts an ONU for half-duplex transmission in ANs with orthogonal modulation formats for both bit stream directions, including a CDD and a control mechanism for adjusting the CDD, according to the present invention.

Reference is now made to FIG. 3 illustrating an ONU 300 with a CDD for half-duplex data transmission, in accordance with the second preferred embodiment of the present invention.

The ONU 300 is connected by line 301 towards the ODN 120 of the AN 100. The downstream 302 enters the CDD 320, which is used for demodulation and detection of the downstream. The detected electrical signal 324 is fed to the electrical receiver 370. This in turn contains methods for electrical signal conditioning and higher layer functionalities. The interconnection to the user interface that is compliant with an AN standard is made via line 371.

The CDD 320 contains a reflective interface RINT 321, an amplifier DAMP 322 and a reflective detector and remodulator (RDR) 323. The reflective nature of the RDR 323 provides feedback towards the RINT 321 at the entrance of the CDD 320. Together with the bidirectional DAMP 322, a periodic transfer function for the CDD 320 is established via the gain ripple of the DAMP 322. While the RINT 321 may be constructed passively, the DAMP 322 can be a SOA or any other suitable amplifier, and the RDR 323 may be an REAM or any other suitable reflective device. The optical length of the CDD 320, determined by the lengths and refractive indices of the DAMP 322 and the RDR 323, as well as the geometry of the RINT 321 and its refractive index, determines the FSR of the generated comb that is used for demodulation of the frequency modulated downstream signal.

The alignment of the comb of the detection function of the CDD 320 to the spectrum of the incident downstream signal is made in a similar way as for the ONU 200. Therefore, the CDD 320 is connected with a bias controller BCTL 350. This controller provides the electrical bias signals 351, 352 and 353 for the RINT 321, the DAMP 322 and the RDR 323, respectively. The RINT 321 may not require a bias signal 351. The alignment of the comb is obtained by small variations of the bias signals 351, 352 and 353 around their usual bias points. On which of the bias signals these variations are applied, depends on the chosen realization for the RINT 321, DAMP 322 and RDR 323. The feedback signal for the BCTL 350 is obtained from the detected downstream signal 324. Alternatively, the steering signal 325 for the BCTL 350 may stem from the RX 370 which can be also provided in addition to the detected signal 324. The BCTL 350 includes an electronic control circuit and an electrical driver circuit that is capable of driving the RINT 321, the DAMP 322 and the DET 323 with appropriate electrical signals, depending on the physical realization of the CDD 320.

The CDD 320 is also used for upstream data transmission. For this reason, the ONU 300 is operated in half-duplex, meaning that at the time during the downstream detection there is no upstream transmission and vice versa. The optical carrier is then remodulated by the CDD 320 and carries the upstream data at the output signal 303.

For modulation, the RDR 323 may be biased differently than for the detection, so that the BCTL 350 will adjust the bias signal 353 during upstream transmission. For this reason, a signal 326 is provided from the TX 360 towards the BCTL 350. The upstream data, provided by the TX 360, is fed via the data interface 324 to the RDR 323.

The transmitter TX 360 contains high layer functionalities as well as adaptation of the electrical driving signal 324. Line 362 connects the TX 360 to the user interface according to an AN standard. The TX 360 is capable of driving the RDR 323 in a proper way, including adaptation of the high frequency data signal. A direct interconnection 372 between RX 370 and TX 360 may be present for higher layer functionality such as signaling inside the AN.

In principle, downstream detection could take place at the same time as upstream modulation, since the downstream carries a constant envelope—although a high penalty may derive from the upstream transmission. As there will be crosstalk from the upstream data into the detected downstream signal due to the shared interconnection 324 towards the RDR 323, the data provided between the interface 372 between TX 360 and RX 370 can be used to inform the RX 370 about the transmitted upstream data, which can then be used by the RX 370 to counteract distortions in the detected downstream.

This can be applied not only to base-band digital signals but also to radio or pass-band signals, by adjusting the frequency deviation and center.

2. Device for Colorless Demodulation and Detection

Figure 4:
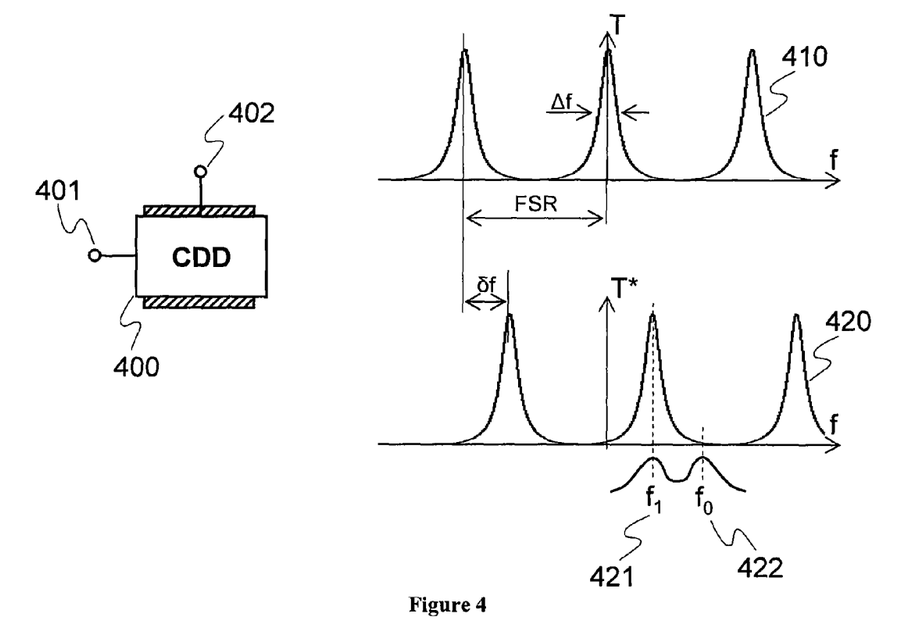
FIG. 4 depicts the CDD with its physical properties, as it is included in the ONUs of the AN, according to the present invention.

Reference is now made to FIG. 4 illustrating the principal properties and requirements for the CDD of the present invention.

The CDD 400 is a structure with an optical input 401, and one or more electrical ports 402, which can be used for biasing the device while at least one port is used to obtain the detected high frequency input signal, which is derived from the signal that enters the optical input 401.

The CDD 400 converts the frequency modulation of the incident optical signal at the input port 401 into intensity modulation, which is present on the electrical output signal at the port(s) 402.

The transfer function 410 for the detected signal has a periodicity in its frequency, which is defined by the free spectral range (FSR), $$T(f+FSR)=T(f)$$

The formed comb-like function is further defined by the full-width half-maximum (FWHM) bandwidth $\Delta f$ of its transmission peaks.

According to the present invention, the following conditions have to be fulfilled by the CDD.
- the periodic transmission function is given over the whole optical wavelength range in which data transmission is considered
- the FSR is adjusted to the bit rate of the incoming signal that enters via the optical port 401, so that colorless operation can be guaranteed
- the bandwidth $\Delta f$ is fixed in accordance with the frequency deviation used for the frequency modulation of the incident optical signal
- the center frequency of one of the transmission peaks can be adjusted by proper means via the electrical port(s) 402 to the incident optical signal, to ensure optimal operation of the CDD. The frequency shift $\delta f$ that can be applied to the transfer function T 410, to relocate the spectral comb for aligning it towards a new, shifted transfer function T* 420, shall be in the range of up to +/−FSR/2, in words: the half FSR in positive and negative direction.

The alignment of the incoming frequency shift keyed data signal with the CDD 400 is made so that the frequency $f_1$ 421 that corresponds to the logical 1-bits (i.e. marks in the bit stream) corresponds with one of the peaks of the transfer function T* 420 and experience in turn maximum transmission the frequency $f_o$ 422 that corresponds to the logical 0-bits (i.e. spaces in the bit stream) corresponds with one of the valleys of the transfer function T* 420 and experience in turn minimum transmission Different preferred embodiments are possible for the CDD 400, which are now explained in more detail.

Figure 5:
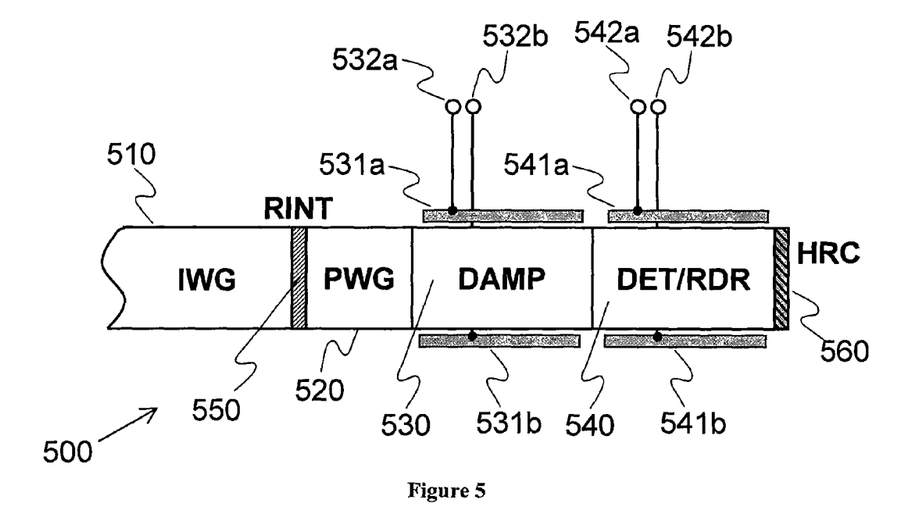
FIG. 5 depicts a preferred embodiment of the CDD, according to the present invention.

Reference is now made to FIG. 5 illustrating a preferred embodiment of the CDD for the present invention.

The CDD 500 comprises an incoming waveguide (IWG) 510, from which the downstream is entering, a DAMP 530 for amplification, and detector/reflective detector and remodulator (DET/RDR) 540. In addition, a cavity is formed by the RINT 550 and the high reflective coating (HRC) 560. The RINT 550 may be separated from the DAMP 530 by a piece of passive waveguide (PWG) 520, which will determine together with the optical lengths of the DAMP 530 and the DET/RDR 540 the FSR of the cavity. The PWG 520 may be discarded, so that the RINT 550 faces directly the DAMP 530.

The IWG 510 can be either a passive waveguide if there is a photonic integrated solution for the ONU, or a fiber-optic waveguide such as a single-mode fiber, which includes then also means of fiber-to-waveguide coupling.

The DAMP 530 may be a suitable optical amplifier, such as a SOA. The DET/RDR 540 may be a suitable optical detector with eventual remodulation capabilities, such as a REAM.

Electrical interfaces exist for the DAMP 530 and the DET/RDR 540. The pump for the DAMP 530 is provided via the electrical interface composed by the connections 532(*a, b*), while the bias for the DET/RDR 540 is provided by the connections 542(*a, b*), from which also the detected high frequency data signal of the downstream may be obtained from.

Electrodes 531(*a, b*) attached to the DAMP 530 allow to inject a bias into the DAMP 530, while electrodes 541(*a, b*) are attached for the same reason at the DET/RDR 540. Electrodes 531*b* and 541*b* may be joined and may be fed via a common electrical interface 532*b*. In this case, the electrical interface 542*b* can be discarded.

While the HRC 560 provides a high reflectivity, derived from e.g. a dielectric multilayer coating, the RINT 550, composed out of another dielectric multilayer coating or other photonic integrateable structures such as photonic crystal mirrors with partial reflectivity, is optimized in its reflectivity towards the DAMP 530 to obtain the best detection performance for the CDD 500.

The tuning of the spectral comb function of the CDD 500 in its shift of spectral maxima and minima is obtained by an adjustment of the optical length of the cavity that is formed between the RINT 550 and the HRC 560.

For the CDD 500, this adjustment is made either via the DAMP 530 or the DET/RDR 540, by adjusting the bias points of either one or both elements, without perturbing the detection performance. In this way the comb is aligned to the incoming downstream signal, and the frequency modulated data will be available as intensity modulated electrical signal at the electrical interface 542(*a, b*) of the DET/RDR 540.

Figure 6:
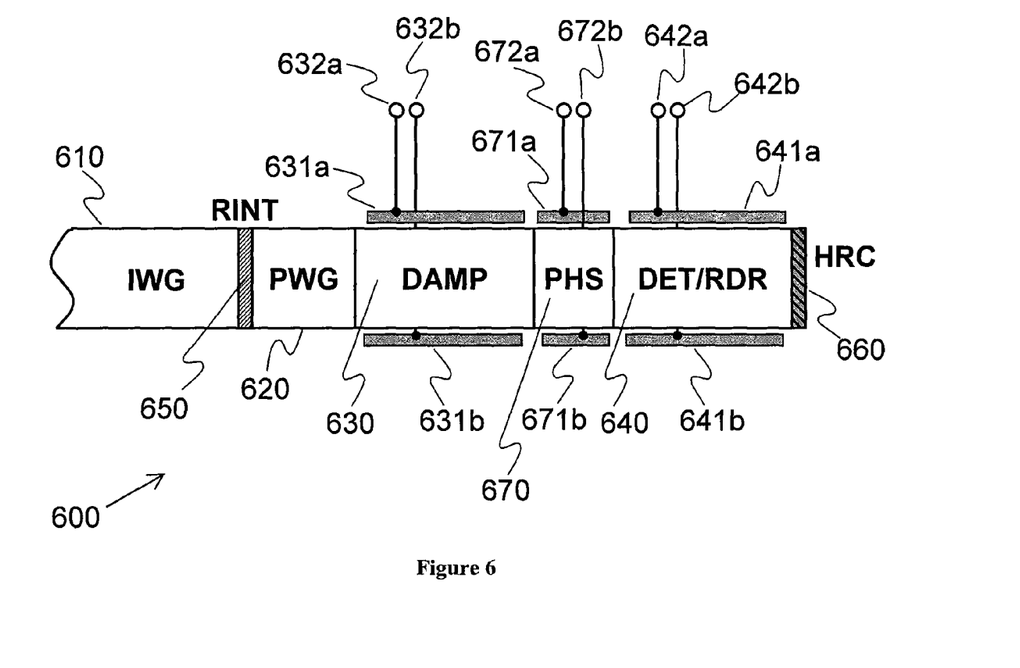
FIG. 6 depicts another preferred embodiment of the CDD, according to the present invention.

Reference is now made to FIG. 6 illustrating another preferred embodiment of the CDD for the present invention.

The CDD 600 originates from the CDD 500 and comprises an IWG 610, a PWG 620, a DAMP 630, a DET/RDR 640, which are placed inside a cavity that is formed by the RINT 650 and the FRC 660. The PWG 620 may be discarded, so that the RINT 650 faces directly the DAMP 630. The IWG 610 can be either a passive waveguide if there is a photonic integrated solution for the ONU, or a fiber-optic waveguide, which includes then also means of fiber-to-waveguide coupling.

Electrical interfaces 632(*a, b*) and 642(*a, b*) connect to electrodes 631(*a, b*) and 641(*a, b*) to provide the drive and bias for the DAMP 630 and the DET/RDR 640. The detected high frequency data signal of the downstream may be obtained from the electrical interface 642(*a, b*).

In addition, a phase-shifting section (PHS) 670 is placed inside the cavity to tune the spectral comb function of the CDD 600 in its shift of spectral maxima and minima. This PHS 670 can be from any suitable type and introduces e.g. a thermo-optical or electro-optical phase shift, and will be in principle from smaller dimensions than the DAMP 630. According to its physical realization, the electrodes 671(*a, b*) may also be heaters in the case of a thermo-optical device. An electrical interface 672(*a, b*) exists for the PHS 670, which is fed from the BCTL that is present in the ONU.

Besides demodulation and detection of frequency modulated downstream signals, the CDD can also be used as a tunable interleaver. This allows to select sub-channels in the actual wavelength channels, which can be an additional aspect of functionality, e.g. in multi-operated ANs where different operators share the fiber plant and transmit their data in different sub-channels.

Figure 7:
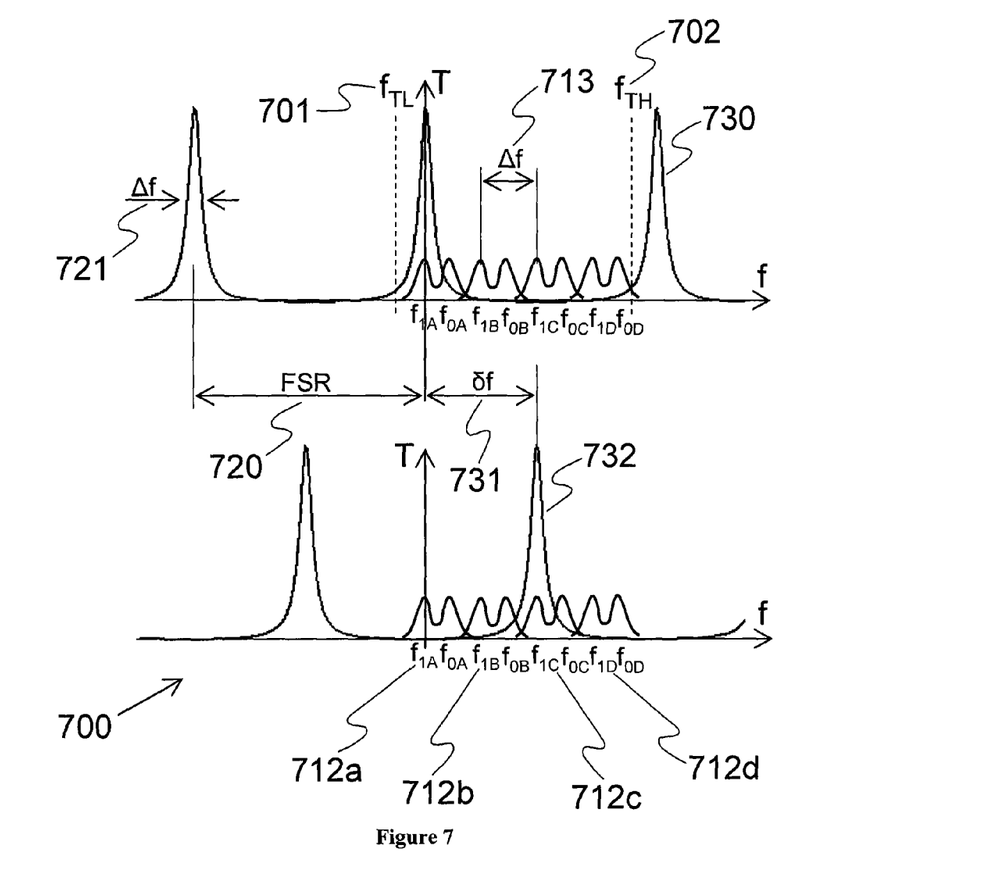
FIG. 7 depicts the functionality for spectral sub-channel selection via the CDD, according to the present invention.

Reference is now made to FIG. 7 illustrating the spectral allocation 700 for the functionality for spectral sub-channel selection via the CDD, according to the present invention.

For the case that the CDD has a high finesse, the latter defined as the ratio between the FSR 720 and the FWHM bandwidth 721, additional downstream signals can be inserted between two maxima of the transfer function of the CDD. These additional signals will be suppressed for detection since they are rejected by the CDD. Depending on the width of the FSR 720, which corresponds to the channel spacing in the case of an WDM-based WDM-AN or WDM/TDM-AN, a specific number of sub-channels can be allocated. These sub-channels are in turn filled with the said additional downstream signals.

The overall wavelength channel, defined by the lower wavelength $f_{TL}$ 701 and the upper wavelength $f_{TH}$ 702, in which the transmission function 730 of the CDD can be tuned according to the requirements of the CDD, is now divided into independent sub-channels, each of them having a bandwidth of Δf 713, where in general Δf 713 is much smaller than FSR 720 for a high finesse. For the example given in FIG. 7, four sub-channels are available, carrying the downstream signals 712(*a, b, c, d*). These signals may for example stem from different operators of an AN.

For selecting one of the sub-channels, the transmission function 730 is now tuned by the shift δf 731 that can be obtained for the CDD, so that the comb function 732 settles for the detection at the desired sub-channel, which is for the case of FIG. 7 the one that holds the downstream signal 712*c*, which has the frequencies $f_{1C}$ and $f_{0C}$ mapped to its 1- and 0-bits.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

The invention claimed is:

1. An integrated semiconductor-based apparatus for a colorless demodulator and detector (CDD), for wavelength-agnostic data reception of frequency shift keyed signals in optical networks, said colorless demodulator and detector (CDD) comprising:
a partially reflective facet (RINT) arranged to receive an incident optical signal containing data which is frequency shift key modulated in its optical frequency, wherein the frequency shift key modulated data has a first frequency corresponding to a first logical value, and a second frequency corresponding to a second logical value, wherein the first and second frequencies are different, and wherein the first and second logical values are different;
a semiconductor optical amplifier (DAMP) arranged after said partially reflective facet (RINT) to i) receive and demodulate the incident optical signal once the incident optical signal has traversed the partially reflective facet (RINT) and ii) to generate a demodulated optical signal, wherein the semiconductor optical amplifier generates gain according to a comb periodic transfer function having a maxima and a minima, and wherein the maxima of the transfer function corresponds to the first frequency and the first logical value, and the minima of the transfer function corresponds to the second frequency and the second logical value;
a semiconductor optical modulator (DET, RDR) acting at least as a photo detector and arranged after said semiconductor optical amplifier (DAMP) to receive and detect the demodulated optical signal once the demodulated optical signal has traversed the semiconductor optical amplifier (DAMP); and
a high reflective facet (HRC) arranged after the semiconductor optical modulator (DET, RDR) to receive the demodulated optical signal once the demodulated optical signal has traversed the semiconductor optical modulator acting as a photo detector (DET, RDR),
wherein said partially reflective facet (RINT) and said high reflective facet (HRC) create an optical cavity around the semiconductor optical amplifier (DAMP) and the semiconductor optical modulator (DET, RDR),
wherein said partially reflective facet (RINT), said semiconductor optical amplifier (DAMP), said semiconductor optical modulator (DET, RDR) and said high reflective facet (HRC) are all of them integrated into a semiconductor-based device constituting said colorless demodulator and detector (CDD), for demodulating and detecting the incident optical signal, wherein the periodic transfer function has a free spectral range (FSR) determined by the optical length of the colorless demodulator and detector (CDD).

2. The apparatus of claim 1, wherein the semiconductor optical amplifier (DAMP) is composed out of a Semiconductor Optical Amplifier.

3. The apparatus of claim 1, wherein the semiconductor optical modulator (DET or RDR) is composed out of a Reflective Electro-Absorption Modulator.

4. The apparatus of claim 1, wherein the semiconductor optical modulator (DET or RDR) is composed out of a Reflective Semiconductor Optical Amplifier.

5. The apparatus of claim 1, wherein the geometrical lengths and refractive indices of the semiconductor optical amplifier (DAMP) and of the semiconductor optical modulator (DET, RDR) as well as the geometry of the partially reflective facet (RINT) and its refractive index determines the optical length of the colorless demodulator and detector (CDD).

6. The apparatus of claim 1, further comprising a bias controller (BCTL) which provides electrical bias signals to at least the semiconductor optical amplifier (DAMP) and the semiconductor optical modulator (DET, RDR), for the alignment of the comb periodic transfer function to the spectrum of the received incident optical signal.

7. The apparatus of claim 6, wherein said bias controller (BCTL) also provides electrical bias signals to the partially reflective facet (RINT) also for the alignment of the comb periodic transfer function to the spectrum of the received incident optical signal.

8. The apparatus of claim 7, wherein the semiconductor optical modulator (DET, RDR) has remodulation capabilities, for remodulation of the incident optical signal into an intensity modulated signal.

9. The apparatus of claim 8, wherein said bias controller (BCTL) provides electrical bias signals to the semiconductor optical modulator (DET, RDR) for making it operate as remodulator which are different to the ones provided thereto to make the semiconductor optical modulator (DET, RDR) operate as a photo detector.

10. The apparatus of claim 6, wherein said optical cavity is tunable and said bias controller (BCTL) provides said electrical bias signals for the tuning of the comb periodic transfer function in its shift of spectral maxima and minima by an adjustment of the optical length of said optical cavity that is formed between the partially reflective facet (RINT) and the high reflective facet (HRC), for spectral sub-channel selection.

11. The apparatus of claim 1, further comprising an electrical receiver arranged for receiving electrical signals detected by the semiconductor optical modulator (DET, RDR).

12. The apparatus of claim 1, further comprising a passive waveguide (PWG) arranged between said partially reflective facet (RINT) and said semiconductor optical amplifier (DAMP).

* * * * *